United States Patent
Matsuo

(10) Patent No.: US 8,154,763 B2
(45) Date of Patent: Apr. 10, 2012

(54) IMAGE FORMING DEVICE, COLOR DATA CONVERSION METHOD, AND COLOR DATA CONVERSION PROGRAM

(75) Inventor: Masaru Matsuo, Osaka (JP)

(73) Assignee: KYOCERA MITA Corporation, Osaka (JP)

( * ) Notice: Subject to any disclaimer, the term of this patent is extended or adjusted under 35 U.S.C. 154(b) by 835 days.

(21) Appl. No.: 12/190,148

(22) Filed: Aug. 12, 2008

(65) Prior Publication Data

US 2009/0051985 A1 Feb. 26, 2009

(30) Foreign Application Priority Data

Aug. 23, 2007 (JP) ................. 2007-217308

(51) Int. Cl.
*H04N 1/60* (2006.01)
*G06K 15/00* (2006.01)
*G06K 9/00* (2006.01)

(52) U.S. Cl. .......... 358/1.9; 358/2.1; 358/518; 382/162; 382/167

(58) Field of Classification Search .................. 358/1.9, 358/2.1, 518, 500, 515, 520, 530; 382/162, 382/167
See application file for complete search history.

(56) References Cited

U.S. PATENT DOCUMENTS

| | | | |
|---|---|---|---|
| 5,625,378 A | 4/1997 | Wan et al. | |
| 6,373,595 B1 | 4/2002 | Semba et al. | |
| 6,882,445 B1 | 4/2005 | Takahashi et al. | |
| 7,221,482 B2 * | 5/2007 | Yamazaki et al. | 358/2.1 |

FOREIGN PATENT DOCUMENTS

| | | |
|---|---|---|
| JP | 2004-104777 | 4/2004 |
| JP | 2006-203432 | 8/2006 |
| JP | 2006-287584 | 10/2006 |
| JP | 2007-074514 | 3/2007 |

\* cited by examiner

*Primary Examiner* — Charlotte M Baker
(74) *Attorney, Agent, or Firm* — Frommer Lawrence & Haug LLP

(57) ABSTRACT

The present invention claims and discloses an image forming device for generating color data contained in a second color gamut of a second device based on color data contained in a first color gamut of a first device. The image forming device comprises a color data generation unit that divides the first color gamut into two or more layers based on a grid point coordinate of a color conversion lookup table; a color gamut compression unit that generates a chroma value of each layer of the second color gamut based on a chroma value of each layer of the first color gamut; and an LUT generation unit that generates the color conversion lookup table based on the generated second color gamut.

15 Claims, 12 Drawing Sheets

(i) First color gamut (ii) Second color gamut

IMAGE FORMING DEVICE, COLOR DATA CONVERSION METHOD, AND COLOR DATA CONVERSION PROGRAM

INCORPORATION BY REFERENCE

This application is based upon and claims the benefit of priority from the corresponding Japanese Patent Application No. 2007-217308, filed Aug. 23, 2007, the entire contents of which is incorporated herein by reference.

FIELD OF THE INVENTION

The present invention teaches and claims an image forming device for executing color data conversion process, color data conversion method which includes a conversion process, and color data conversion programs for executing the color data conversion method. In particular the present invention teaches and claims an image forming device for generating second color data contained in a second color gamut of a second device from first color data contained in a first color gamut of a first device, a color data conversion method, and a color data conversion program.

BACKGROUND OF THE INVENTION

The image forming device represented by a color printer and the like generally includes a three-dimensional lookup table (hereinafter abbreviated as "LUT") for converting a multi-dimensional color signal input from a host computer etc. to another multi-dimensional color signal and outputting such color signal, where a suitable color conversion process can be performed and a desired image output process can be performed by referencing the LUT.

Specifically, the LUT can be used in a color data conversion method of generating second color data contained in a printer color gamut (second color gamut) in a L*a*b* color space, (hereinafter "L*a*b* space") (L* is a number that represents lightness of color; a* represents position of color between red/magenta and green; and b* represents the color position between yellow and blue), corresponding to a Cyan, Magenta, and Yellow color space, (hereinafter "CMY space"), of a printing device (second device) such as a color printer from first color data contained in a display color gamut (first color gamut) in the L*a*b* space generally corresponding to an Red, Blue, Green color space, (hereinafter "RGB space") of a color display device (first device) such as a CRT display.

The following method is purported to be for the related art of such color data conversion method.

A method including a virtual color gamut obtaining process, a color data conversion process, and a color data generating process is proposed.

The virtual color gamut obtaining process converts one or more values of a brightness value, a chroma value, and a hue angle value of the second color gamut, and obtains an extended virtual color gamut including at least all the brightness values of the first color gamut.

The color data conversion process changes one or more values of the brightness value, the chroma value, and the hue angle value with respect to the color data of the first color gamut, that is, not contained in the virtual color gamut and obtains third color data contained in the virtual color gamut.

The color data generating process performs an inverse conversion on the second color gamut in the virtual color gamut obtaining process, and performs the conversion on the third color data obtained in the color data changing process. The process generates second color data.

There is another method relating to a color gamut compression device for compressing a color gamut. The color gamut is compressed by converting a color expressed by an input system information equipment to a color within a color gamut reproducible by an output system information equipment. The color gamut compression device includes a converging point calculation unit for calculating a converging coordinate. Calculation of the coordinate is based on an arbitrary point that has the same hue as a color that is within a color gamut of the output system information equipment and a chromatic color as a converging point. The calculation uses the arbitrary point when a digital signal value of the input system information equipment corresponds to a determined color. The color is determined based on the color of the input system information equipment reproduced with the output system information equipment. Pursuant to the technique for compressing a color gamut, the device further comprises a first compression point calculating unit for calculating a compression point as coordinate of an arbitrary point on a substantially straight line. The substantially straight line connects the converging point and a point, corresponding to the color of the input system information equipment and being within the color gamut of the output system information equipment as a compression point. The color gamut compression device also comprises, in accordance with the color gamut compression technique, a compression unit for converting the color of the input system information equipment to a color corresponding to the compression point calculated by the first compression point calculating unit.

Furthermore, another method relates to matching color performed between a first image equipment and a second image equipment having different color reproduction ranges. According to this method, a color gamut color compression unit for performing color gamut compression links a color in the color gamut of the color of the first image equipment and a color in the color gamut of the color of the second image equipment. A color gamut outermost contour color gamut compression unit links a color gamut outermost contour color of the color of the first image equipment and a color gamut outermost contour color of the color of the second image equipment. A lookup table creating unit creates a lookup table to perform color conversion on a color of the second image equipment using a color signal calculated by the color gamut color compression unit and the color gamut outermost contour compression unit. Finally according to this method, a color conversion processing unit performs color conversion on the color of the second image equipment using the lookup table from the lookup table creating unit are arranged.

There is another method relating to a color gamut compression method for compressing input image data of a first color gamut into a second color gamut in order to obtain output image data. The method includes a compressing step of compressing a value of the color data not contained in the second color gamut from the color data of each color in the first color gamut into a value of the color data contained in the second color gamut through a predetermined compression calculation. This method further comprises a tone generating step of having the values of a plurality of color data of the same value after the compression step as values of different color data in the second color gamut.

In the related methods, there is a high possibility that the tones in the same hue may lose continuity when compression of the color gamut is performed.

SUMMARY OF THE INVENTION

It is an object of the present invention to provide an image forming device, a color data conversion method, and a color data conversion program capable of enabling compression process of the color gamut without losing continuity of tones in the same hue.

One aspect of the present invention is to provide an image forming device for generating color data contained in a second color gamut of a second device based on color data contained in a first color gamut of a first device. The image forming device includes a color data generation unit that divides the first color gamut into two or more layers based on grid point coordinates of a color conversion lookup table. Furthermore, the device includes but is not limited to a color gamut compression unit that generates a chroma value of each layer of the second color gamut based on a chroma value of each layer of the first color gamut. The device also includes an LUT generation unit that generates the color conversion lookup table based on the generated second color gamut.

Another aspect of the present invention is to provide a color data conversion method for generating color data in a second color gamut of a second device based on color data contained in a first color gamut of a first device. The color data conversion method includes but is not limited to a color data generation step for dividing the first color gamut into two or more layers based on grid point coordinates of a color conversion lookup table. The method also comprises a color gamut compression step for generating a chroma value of each layer of the second color gamut based on a chroma value of each layer of the first color gamut. And the method has a LUT generation step for generating the color conversion lookup table based on the generated second color gamut.

Another further aspect of the present invention is to provide a recording medium for storing color data conversion programs. The stored programs cause a computer of an image forming device to execute a process of generating color data contained in a second color gamut of a second device based on color data contained in a first color gamut of a first device. The recording medium stored with programs for causing the computer of the image forming device to execute a color data generation step for dividing the first color gamut into two or more layers based on grid point coordinates of a color conversion lookup table. Next the programs cause the computer to execute a color gamut compression step for generating a chroma value of each layer of the second color gamut based on a chroma value of each layer of the first color gamut. Then the computer executes a LUT generation step for generating the color conversion lookup table based on the generated second color gamut.

These and other objects, features, aspects and advantages of the present invention will become more apparent from the following detailed description of the present invention when taken in conjunction with the accompanying drawings.

In this text, the terms "comprising", "comprise", "comprises" and other forms of "comprise" can have the meaning ascribed to these terms in U.S. Patent Law and can mean "including", "include", "includes" and other forms of "include".

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which exemplary embodiments of the invention are illustrated in the accompanying drawings in which corresponding components are identified by the same reference numerals.

BRIEF DESCRIPTION OF THE DRAWINGS

The following detailed description, given by way of example, but not intended to limit the invention solely to the specific embodiments described, may best be understood in conjunction with the accompanying drawings, in which.

DESCRIPTION OF THE PREFERRED EMBODIMENTS

Reference will now be made in detail to various embodiments of the present invention, one or more examples of which are illustrated in the accompanying drawings. Each example is provided by way of explanation of the present invention, and by no way limiting the present invention. In fact, it will be apparent to those skilled in the art that various modifications, combination, additions, deletions and variations can be made in the present invention without departing from the scope or spirit of the present invention. For instance, features illustrated or described as part of one embodiment can be used in another embodiment to yield a still further embodiment. It is intended that the present invention covers such modifications, combinations, additions, deletions, applications and variations come within the scope of the appended claims and their equivalents.

The preferred embodiments of the image forming device, the color data conversion method, and the color data conversion program according to the present invention will now be described with reference to the drawings.

Image Forming Device and Color Data Conversion Method

First, an embodiment of the image forming device and the color data conversion method of the present invention will be described with reference to FIG. 1.

Figure 1:
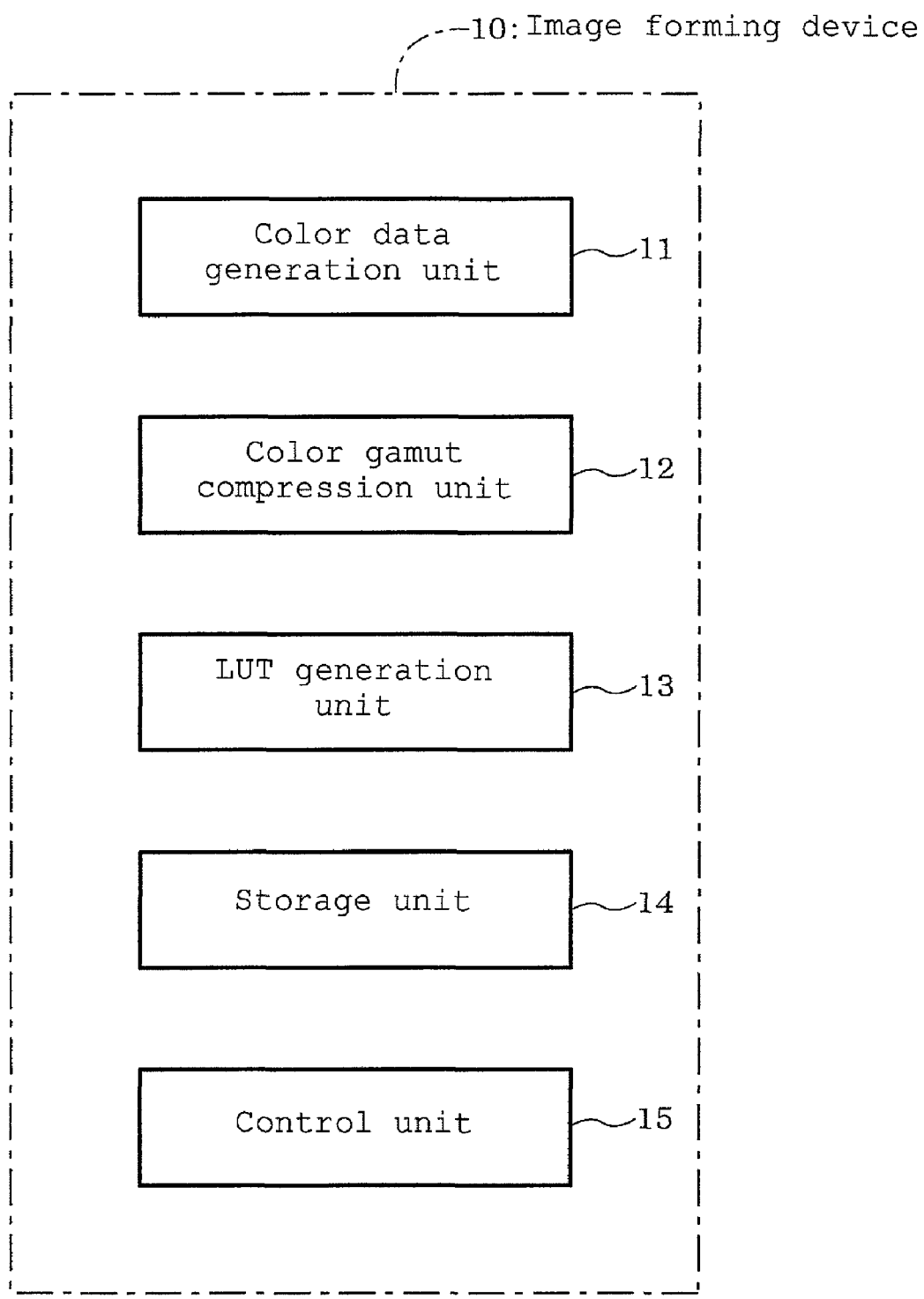
FIG. 1 is a block diagram showing a configuration of an image forming device according to one embodiment of the present invention.

FIG. 1 is a block diagram showing a configuration of the image forming device according to one embodiment of the present invention.

As shown in the figure, the image forming device 10 comprises a color data generation unit 11, a color gamut compression unit 12, an LUT generation unit 13, a storage unit 14, and a control unit 15.

The color data generation unit 11 executes a color data generation process. The color data generation process divides a first color gamut into two or more layers based on a grid point coordinate of a color conversion lookup table ("C-LUT"). Next the process obtains a maximum chroma value from each layer. Then the process obtains magnitude and (or) direction of a vector from the maximum chroma value of one layer to a maximum chroma value of the next layer.

The color gamut compression unit 12 executes a color gamut compression process. The color gamut compression process generates a chroma value of each layer of a second color gamut based on the chroma value of each layer of the first color gamut. That is, the color gamut compression process compresses the maximum chroma value of the outermost layer of the first color gamut to a maximum chroma value of the outermost layer of the second color gamut. The color gamut compression process also generates a maximum chroma value for each layer of the second color gamut based on magnitude and (or) direction of the vector, with the maximum chroma value of the outermost layer of the second color gamut as a starting point. Then the process determines the range of each layer of the second color gamut based on the maximum chroma value of each layer and compresses the hue value of the first color gamut to the second color gamut based on the range of each layer.

The LUT generation unit 13 executes an LUT generation process. The LUT generation process generates a color conversion lookup table based on the second color gamut compressed and generated in the color gamut compression unit 12.

The storage unit 14 stores data and program related to various functions of the image forming device 10.

The storage unit 14 stores various data used in the color data generation process, the color gamut compression process, and the LUT generation process stores C-LUT, chroma value, hue value, and color data.

The control unit 15 is configured by a CPU (Central Processing Unit) and the like. The control unit 15 reads and executes the program stored in the storage unit 14 to send a command to each configuring units of the image forming device 10, or operates on its own to execute/control various functions of the image forming device 10.

In addition to the configuration shown in FIG. 1, the image forming device 10 of the present embodiment comprises a communication unit, a display unit, a printing unit, and the like.

The operation (color data conversion method) of the image forming device of the present embodiment will now be described with reference to FIG. 2.

Figure 2:
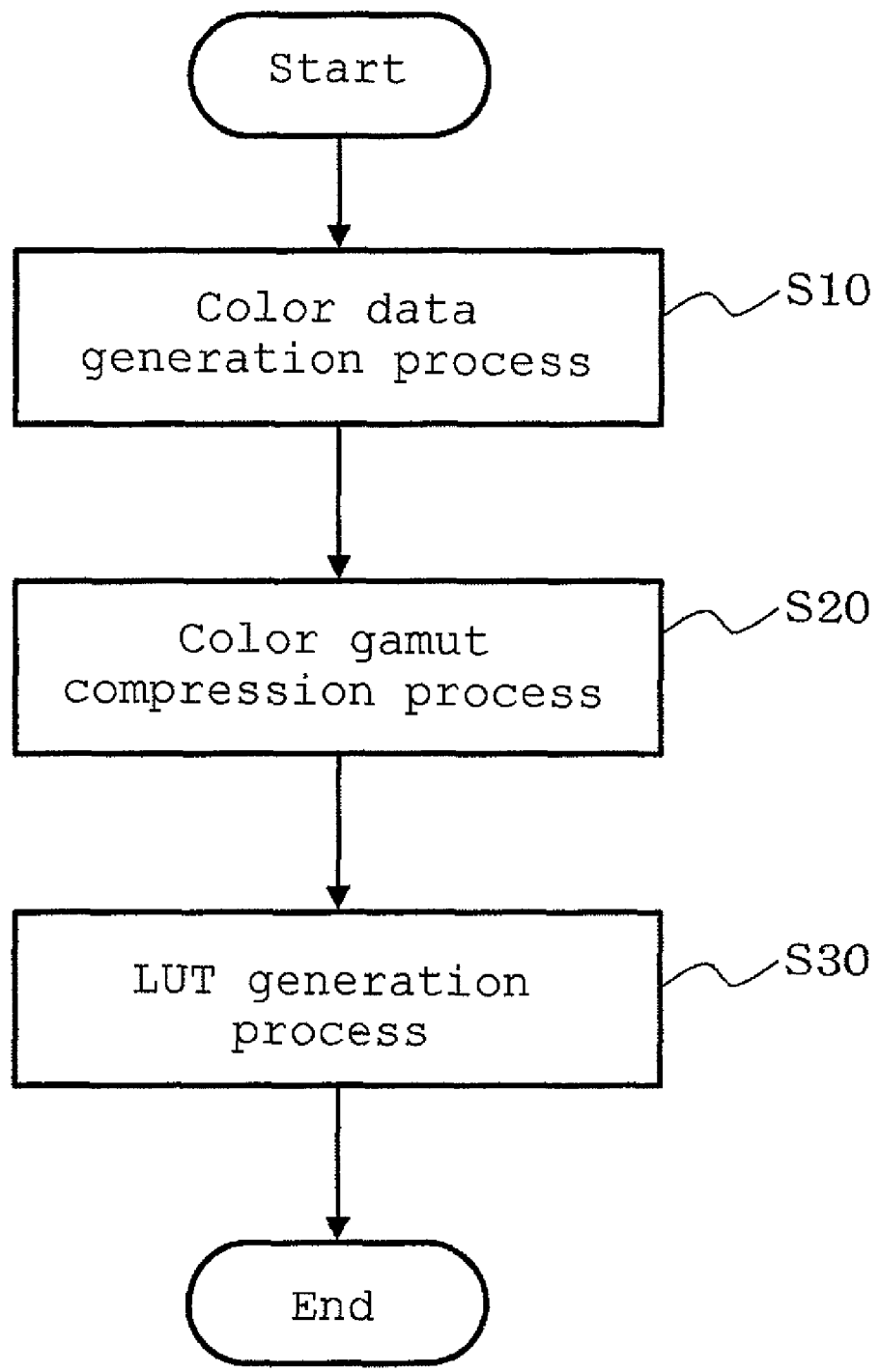
FIG. 2 is a flowchart showing a process of a color data conversion method according to another embodiment of the present invention.

FIG. 2 is a flowchart showing the operation of the image forming device according to another embodiment of the present invention.

As shown in the figure, the color data conversion method of the present embodiment includes but is not limited to the color data generation process (step 10), the color gamut compression process (step 20), and the LUT generation process (step 30).

Figure 3:
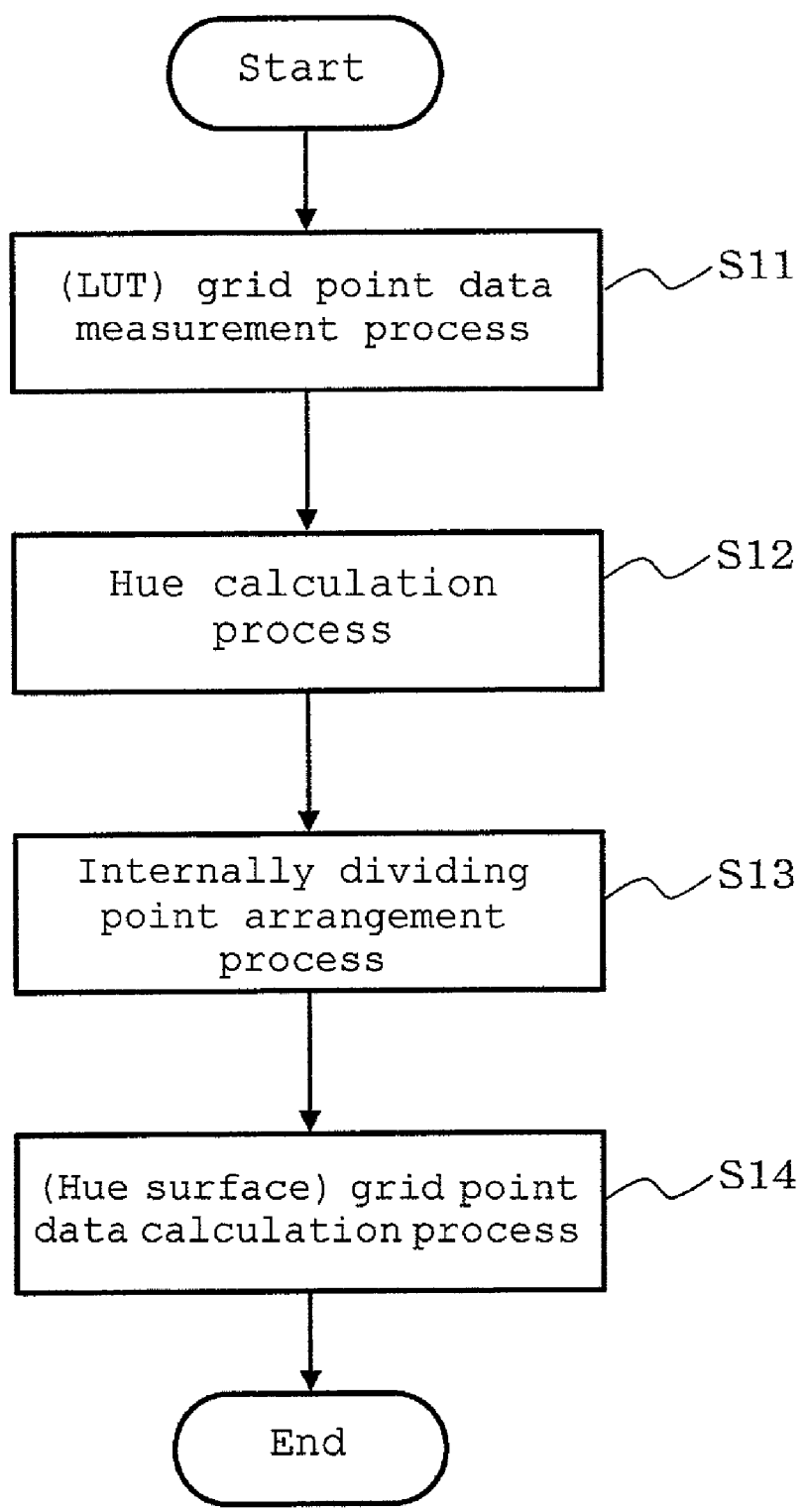
FIG. 3 is a flowchart showing a process of a color data generation process according to yet another embodiment of the present invention.

As shown in FIG. 3, the color data generation process includes a grid point data measurement process (step 11), a hue calculation process (step 12), an internally dividing point arrangement process (step 13), and a grid point data calculation process (step 14).

The following description is made according to such procedural process.

The color data conversion method according to one embodiment of the present invention compresses a high chroma value of a certain color gamut of the first color gamut to a compression color space divided in the second color gamut.

In this embodiment, the first color gamut is a display color gamut corresponding to an RGB color space used in a color display device of the CIE-L*a*b* color space. The second color gamut is a printer color gamut corresponding to a Cyan-Magenta-Yellow-blacK color space ("CMYK color space") used in a color printing device of the CIE-L*a*b* color space.

Color Data Generation Process

In the present embodiment, the C-LUT has an output color corresponding to an input RGB signal value that assumes the output space of the image forming device (color printing device).

Figure 4:
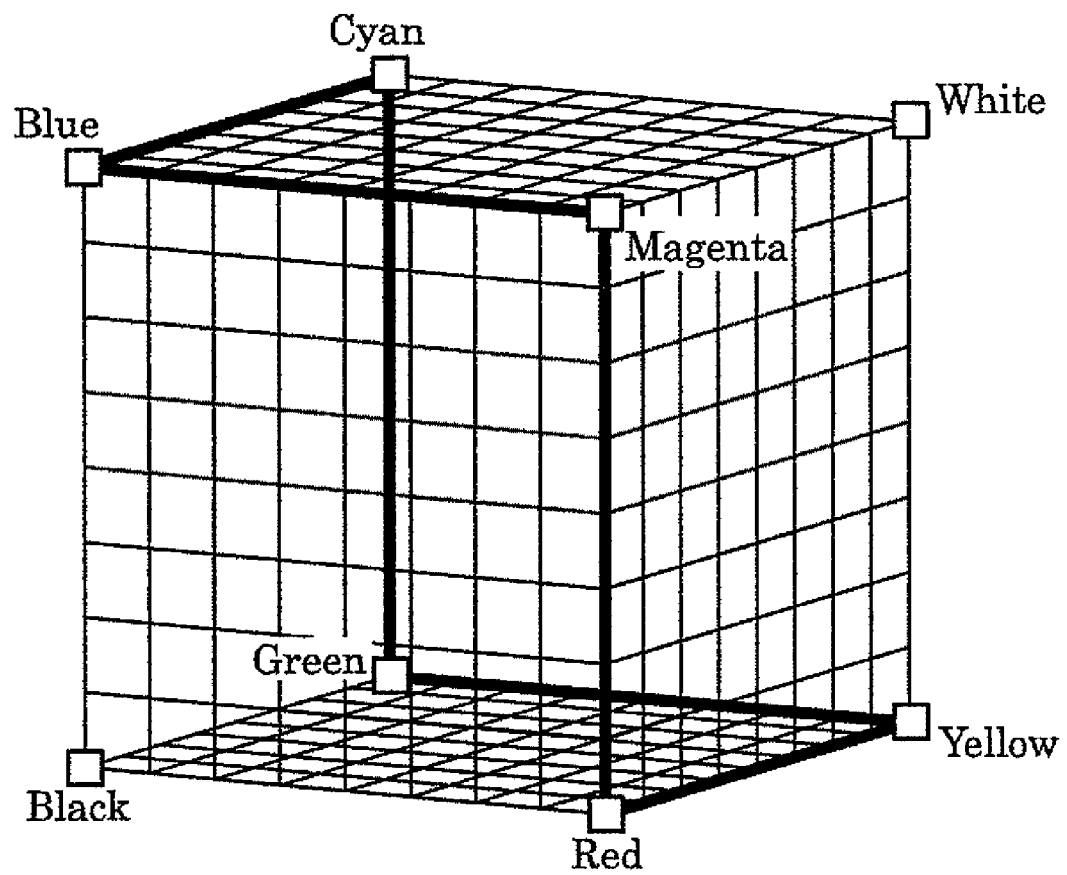
FIG. 4 is a three-dimensional view showing a configuration of C-LUT according to a further embodiment of the present invention.

Here, the C-LUT is partitioned into a grid shape and has a plurality of grid points, as shown in FIG. 4. In the present embodiment, the input RGB signal is configured by data of eight bits (0 to 255) for each color, where the C-LUT has a grid point interval of eight, and the number of grid points of nine, as shown in the figure.

The image forming device 10 converts an arbitrary input image data (RGB) to output image data (CMYK) by referencing the C-LUT, and performs image output.

The color data generation unit 11 of the image forming device 10 measures each grid point data of the C-LUT, and obtains a CIE-LAB value ((LUT) grid point data measurement process, step 11 of FIG. 3).

Specifically, the process is performed as follows.

Since the CMYK value corresponding to the RGB value is determined in the C-LUT, a patch of RGB value for the grid point is printed on a color chart, and the LAB corresponding to the relevant RGB value is obtained through measurement by spectral reflectivity using a commercially available spectrophotometric and colorimetric instrument.

All the hues containing the grid points of the C-LUT are calculated (hue calculation process, step 12). The arrangement of the grid points of the C-LUT is as shown in FIG. 4.

The calculation method may be a general calculating formula such as CIE-LCH.

The data necessary for calculating the hue data is BK, White, and outermost contour RGB value which is an arbitrary point on each line of Red-Yellow, Yellow-Green, Green-Cyan, Cyan-Blue, Blue-Magenta, and Magenta-Red.

Figure 5:
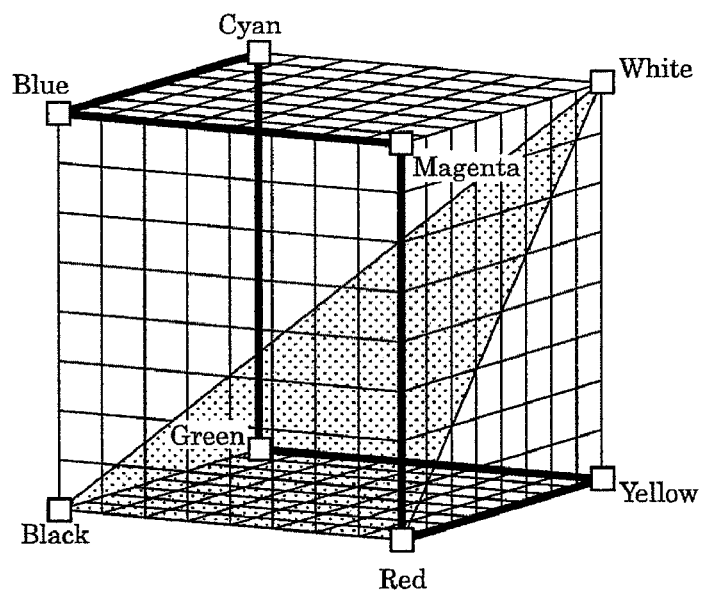
FIG. 5 is a three-dimensional view showing a hue of red from FIG. 4.

The hue surface of each hue is set by a closed region of triangular shape surrounded by a line connecting three points of Bk, White, and the point in the relevant hue at the outermost contour. For instance, the hue surface of Red is set by a closed region of triangular shape surrounded by a line connecting three points of Bk, White, and Red, as shown in FIG. 5.

Figure 6:
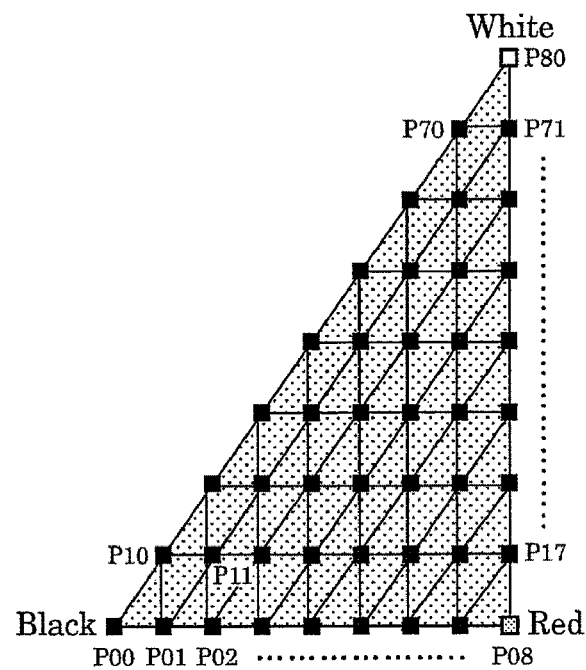
FIG. 6 is a view of a certain hue taken out from FIG. 5.

The internally dividing point that equally divides the RGB value of each hue surface to (9-1) is grid point arranged in the form shown in FIG. 6 (internally dividing point arrangement process, step 13). This is the grid point RGB value of the hue data of Red in the RGB value of the C-LUT.

With the grid point RGB value of the hue data, the CMYK value and the CIE-LAB are calculated from the C-LUT through cubic interpolation and tetrahedral interpolation calculation ((hue surface) grid point data calculation process, step 14).

Figure 7:
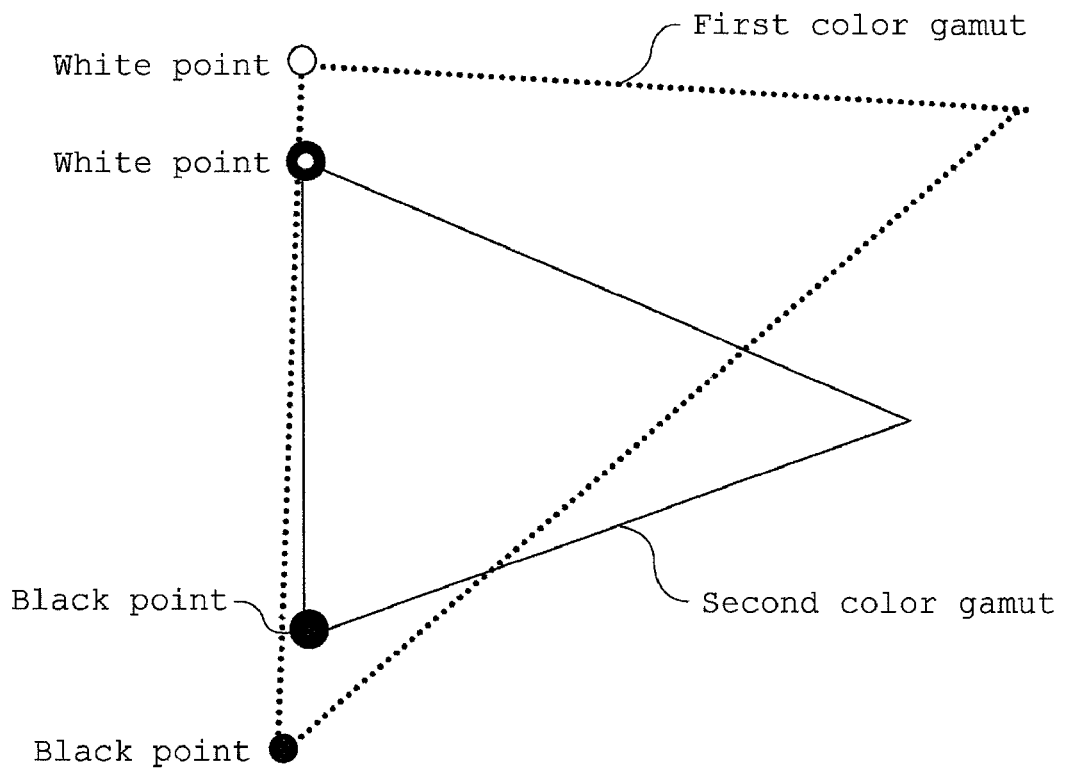
FIG. 7 is a view showing a brightness correction process of a white point of different color gamut according to yet another embodiment of the present invention.

Each range of the first color gamut and the second color gamut of the C-LUT in the calculated CIE-LAB space (C-LUT expressed in CIE-LAB coordinate) is shown in FIG. 7.

In FIG. 7, the vertical direction indicates brightness and the horizontal direction indicates chroma. That is, the brightness becomes higher and the concentration becomes lower in the upward direction. On the other hand, the brightness becomes lower and the concentration becomes higher in the downward direction. At the horizontal direction, the chroma becomes higher the further away with the grayscale as the center.

Color Gamut Compression Process

The color gamut compression unit 12 of the image forming device 10 executes the color gamut compression process (step 20). The color gamut compression process is a process of compressing the high chroma value of a certain hue of the first color gamut to the compression color space divided in the second color gamut.

Step 1-1 (Correction of White Point)

Figure 8:
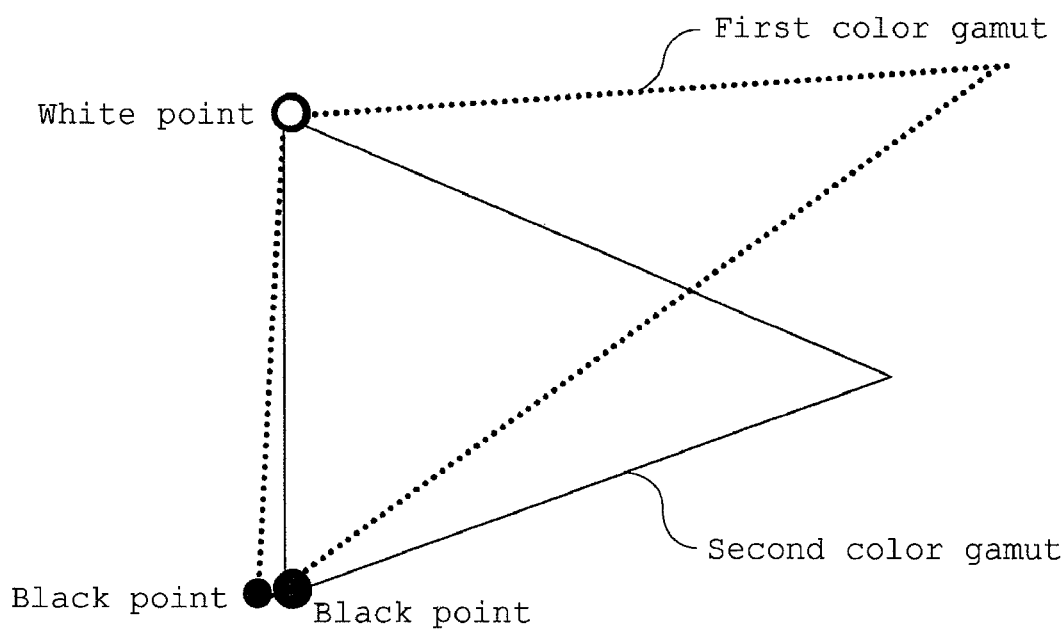
FIG. 8 is a view showing a color gamut after the brightness correction process of the white point of different color gamut is performed.

As shown in FIG. 7, when the first color gamut and the second color gamut exist, the white point of the first color gamut is adjusted so as to line-up on the CIE a*b* plane the same way as the white point of the second color gamut. The first color gamut and the second color gamut after the adjustment are shown in FIG. 8.

The correction method of white point is expressed by the following equation:

$$(Da\_wp, Db\_wp) = (a1\_wp - a2\_wp, b1\_wp - b2\_wp) \quad \text{(Eq. 1)}$$

where, white point of first color gamut: $L1\_wp, a1\_wp, b1\_wp$ white point of second color gamut: $L2\_wp, a2\_wp, b2\_wp$ The black point of the first color gamut may be adjusted (corrected) so as to lie on the CIE a*b* plane the same way as the black point of the second color gamut.

Step 1-2 (Correction of Color Data of First Color Gamut)

With the correction of the white point, other color data of the first color gamut are also adjusted.

The correction method of color data of first color gamut is expressed by the following equation:

$$L1\_adjust = L1 \quad \text{(Eq. 2-1)}$$

$$a1\_adjust = a1 + Da\_wp \quad \text{(Eq. 2-2)}$$

$$b1\_adjust = b1 + Da\_wp \quad \text{(Eq. 2-3)}$$

where, color data of first color gamut: $L1, a1, b1$ color data after correction of first color gamut: $L1\_adjust, a1\_adjust, b1\_adjust$ Step 2

Figure 9:
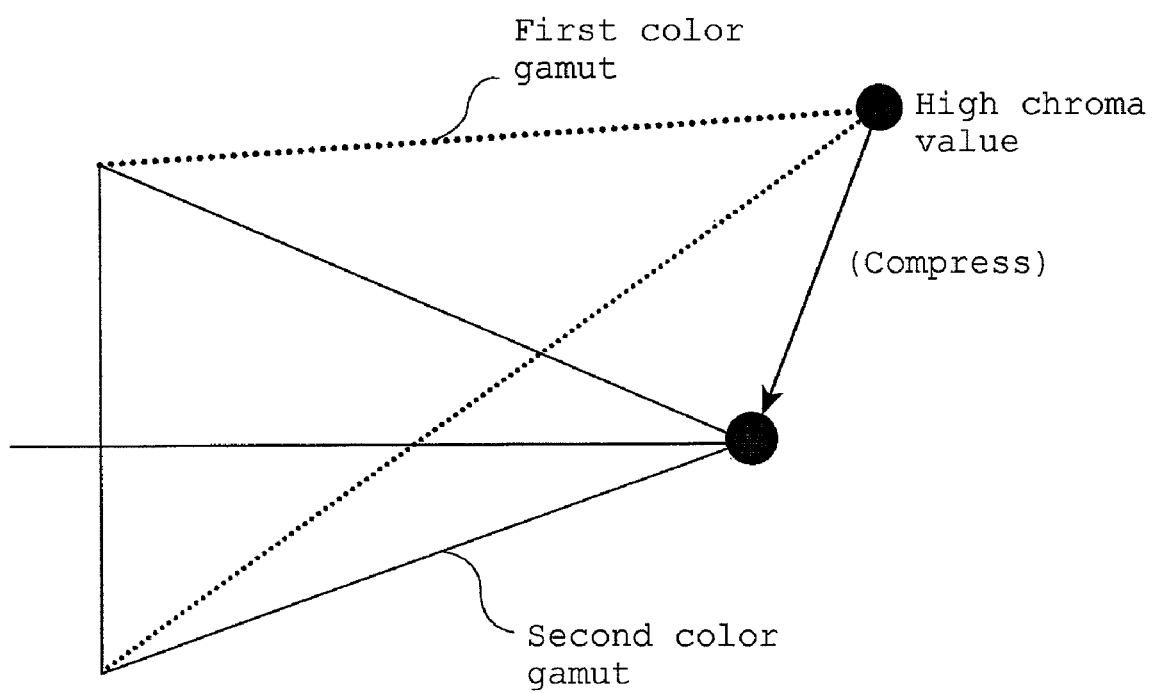
FIG. 9 is a view showing a state of moving a high chroma value of the first color gamut to a layer of the second color gamut.

As shown in FIG. 9, the high chroma value of a certain hue of the first color gamut is compressed to an arbitrary point in a certain layer of the second color gamut.

Step 3

The second color gamut is divided. The division is carried out according to the following method.

Figure 10:
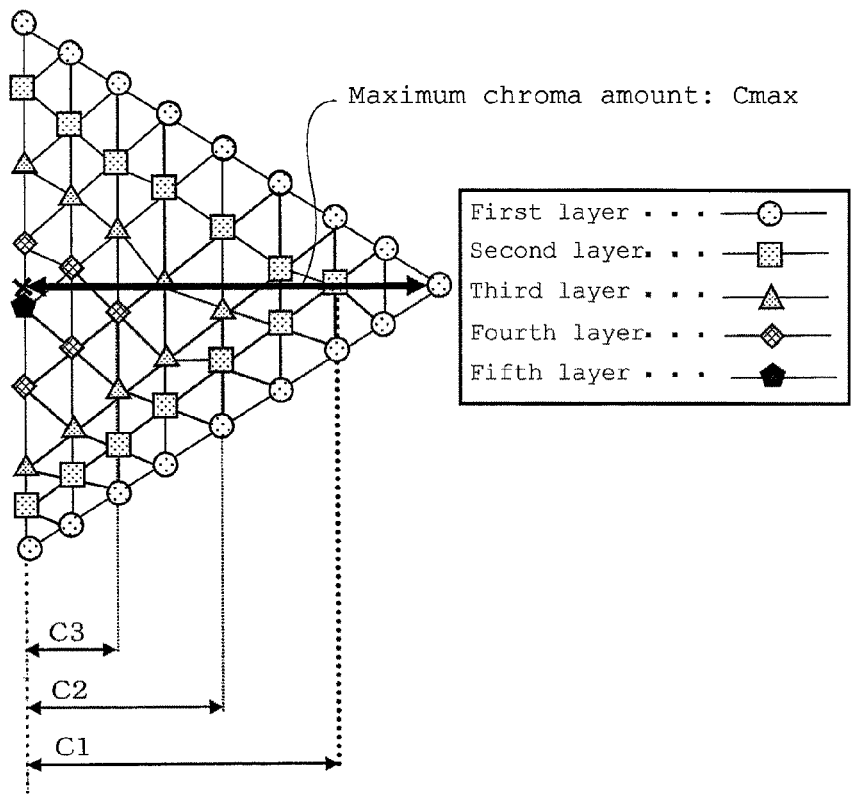
FIG. 10 is a view showing a maximum chroma value in each layer of a certain hue according to still yet another embodiment of the present invention.

The first color gamut shown in FIG. 6 is expressed in a CIE-L*a*b* coordinate system, as shown in FIG. 10. Each grid point forms each layer (first layer to fifth layer in the figure shown).

The chroma value Cmax is the high chroma value of a certain hue of the first color gamut, and is assumed as an amount shown in the figure. That is, the maximum chroma value of the outermost layer (first layer) is the chroma value Cmax.

As shown in the figure, each chroma value of each layer on the inner side of the same hue is C1 (second layer), C2 (third layer), and C3 (fourth layer).

A scalar correction magnitude (Vadjust_n) of a chroma value determination vector for each layer is expressed by the following equation:

$$V\text{adjust}\_n = Cn/C\text{max} \ (n=1, 2, 3) \quad \text{(Equation 3)}$$

Figure 11:
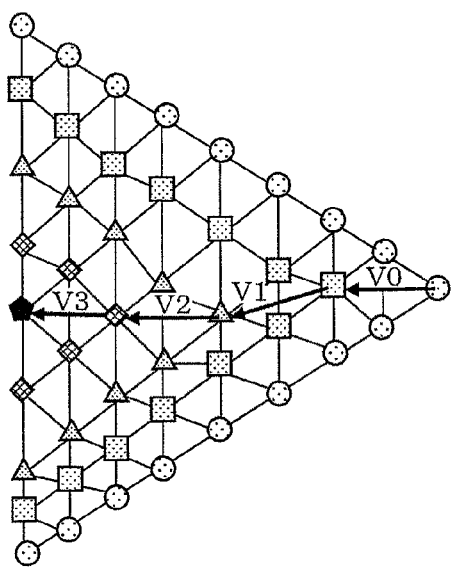
FIG. 11 is a view showing a transition of the maximum chroma value in each layer of a certain hue according to yet a further embodiment of the present invention.

Each of the high chroma values, namely, Cmax, C1, C2 and C3 of a group (group of grid points belonging to one layer, see FIG. 10) of layers of a certain hue of the first color gamut, and the fifth layer, the vectors (V0, V2 and V3) respectively directed from Cmax to C1, C1 to C2, C2 to C3, and C3 to fifth layer are shown in FIG. 11.

The vector V0 is the vector directed from Cmax to C1, the vector V1 is the vector directed from C1 to C2, the vector V2 is the vector directed from C2 to C3, and the vector V3 is the vector directed from C3 to fifth layer.

The directions of the vectors V0, V2 and V3 are then calculated.

Subsequently, the maximum chroma value of each layer of the second color gamut is generated in a mapping relationship with the point generated in step 2 as the starting point based on the directions of the vectors V0, V2 and V3.

In the present embodiment, the directions of the vectors V0, V2 and V3 are calculated, but the magnitudes of the vectors V0, V2 and V3 may be calculated with their respective directions. In this case, the magnitudes of the vectors V0, V2 and V3 are corrected using equation 3.

The parameters for correcting the CIE L* axis of each layer are also prepared individually.

Figure 12:
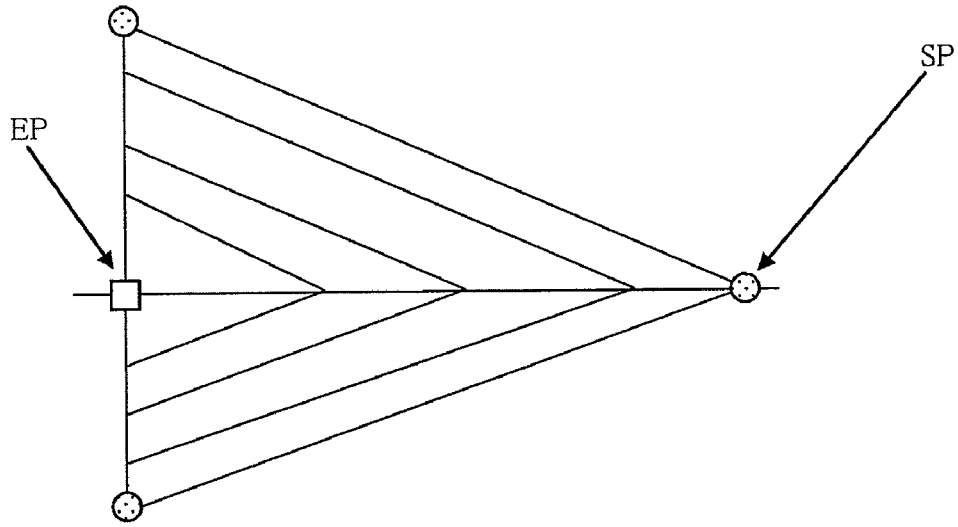
FIG. 12 is a schematic diagram showing calculation to obtain a necessary value for color gamut compression according to an embodiment of the present invention.
Figure 13:
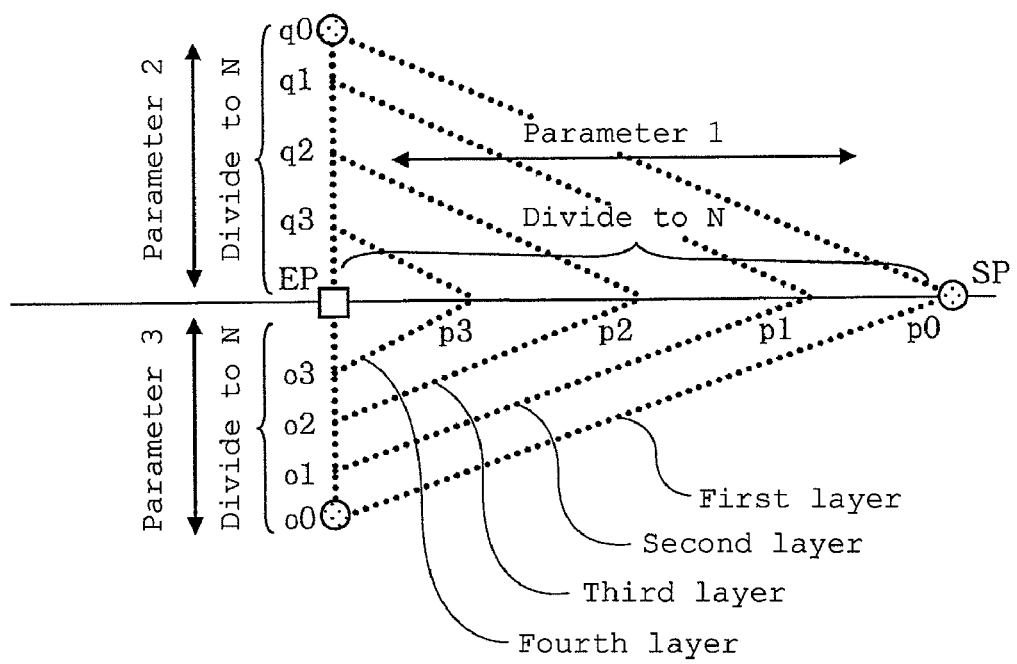
FIG. 13 is a view showing a state in which a certain hue is divided into layers.

As a method of calculating the parameter value of L*, the maximum chroma value of a certain hue is assumed as SP. The value at the intersection when the L* axis from the maximum chroma value SP to the (L*, a*, b*)=(L*, 0, 0) axis is fixed is assumed as EP. Both SP and EP are shown in FIG. 12. As shown in FIG. 13, ratio calculation is performed with the value of EP, the value in the q0 direction, and the value in the o0 direction to calculate q0 to q3, and o0 to o3.

This calculation is performed using Vadjust_n obtained in equation 3:

$$q\_\max = (q0 - EP) \quad \text{(Eq. 4)}$$

$$o\_\max = (EP - o0) \quad \text{(Eq. 5)}$$

$$qn = q\_\max \times V\text{adjust}\_n \ (n=0, 1, 2, 3) \quad \text{(Eq. 6)}$$

$$on = o\_\max \times V\text{adjust}\_n \ (n=0, 1, 2, 3) \quad \text{(Eq. 7)}$$

The ratio calculation for obtaining q1, q2, q3, o1, o2, and o3 is performed in the following manner.

As shown in FIG. 13, the intersection between the axis connecting the white point (q0) and the black point (o0) and a perpendicular line passing through the maximum chroma value SP (p0) is assumed as EP. The chroma value of each layer is p1, p2, and p3.

The ratio Vadjust_n of the chroma value of each layer with respect to the maximum chroma value SP (p0) is obtained (n=1, 2, 3).

The distance from EP to the white point (q0) is calculated, and the ratio Vadjust_n obtained above is then obtained.

Therefore, q1, q2, and q3 represent the amount of brightness value with respect to the chroma value (white point direction). Similarly, o1, o2, and o3 represent the amount of brightness value with respect to the chroma value (black point direction).

The range surrounded by the maximum chroma value, with two end points assumed as a range for every layer. Specifically, the range of the first layer is the range surrounded by SP-q0-o0-SP. The range of the second layer is the range surrounded by p1-q1-o1-p1. The range of the third layer is the range surrounded by p2-q2-o2-p2. The range of the third layer is the range surrounded by p3-q3-o3-p3.

Figure 14:
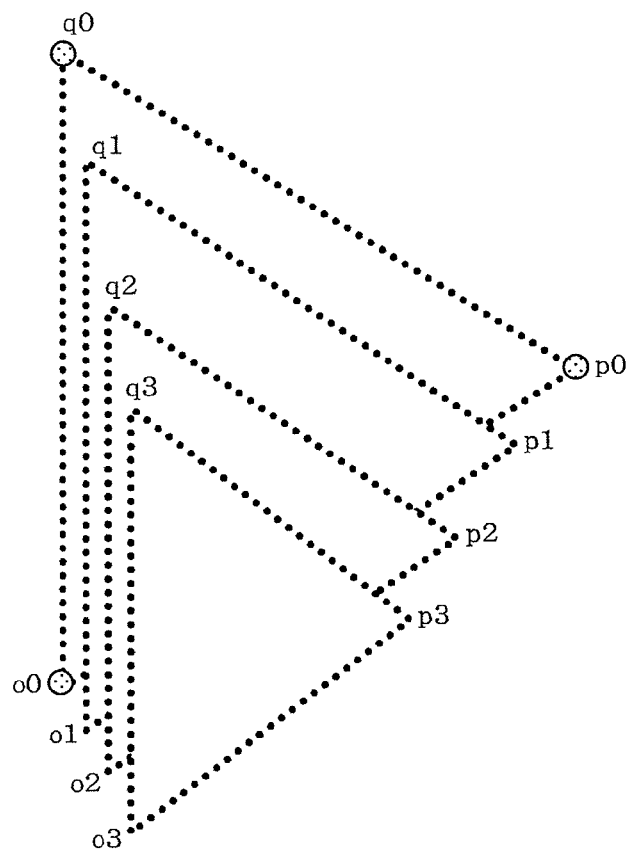
FIG. 14 is a view showing each layer of FIG. 13 according to the present invention.

Each layer of the first color gamut shown in FIG. 13 can be separated as shown in FIG. 14.

Step 4

After each layer of a certain hue of the second color gamut is determined in step 3, the hue value of the first color gamut is then compressed.

Figure 15:
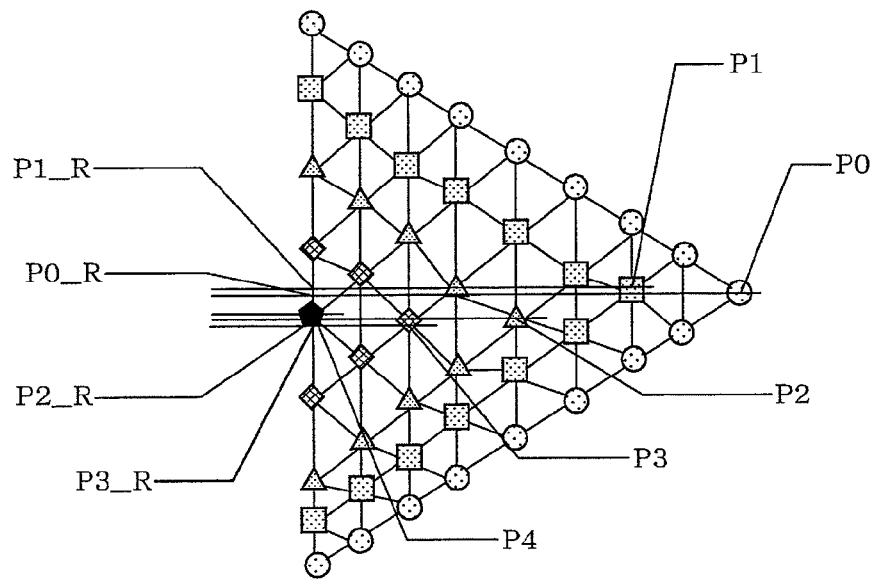
FIG. 15 is a view showing a value that becomes a target point of compression when compressing to a layer generated in a certain hue.

The points (target points) of Pn_R (n=0, 1, 2, 3) are calculated as compression data to be used when performing compression (see FIG. 15).

The target point Pn_R is an intersection of a perpendicular line passing through the maximum chroma value SP of each layer out of the perpendicular lines with respect to the L* axis.

When compressing the hue value of the first color gamut to each layer, the data is moved towards Pn_R (n=0, 1, 2, 3) or the target point of compression, and the point intersecting with each layer is set as the color data of after compression.

Figure 16:
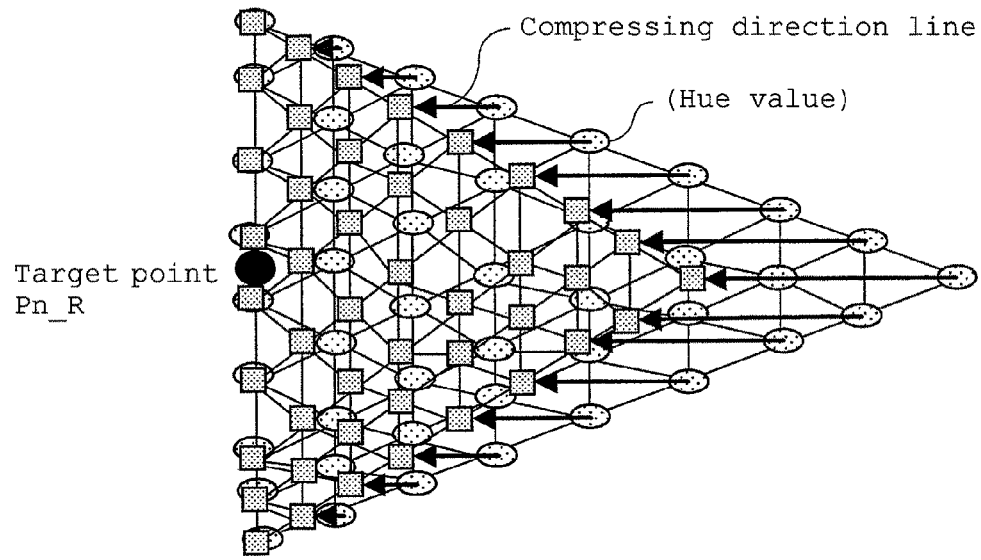
FIG. 16 is a target point view showing a state of compressing from the first color gamut to the second color gamut according to still a further embodiment of the present invention.

In other words, as shown in FIG. 16, each hue value of the first color gamut and the target point Pn_R (intersecting point) are connected with a line. Such a line is assumed as a compressing direction line. The point being within the range of the layer the hue value belongs to, and being on the line of the compressing direction line, is assumed as the color data after compression of the hue value.

Figure 17:
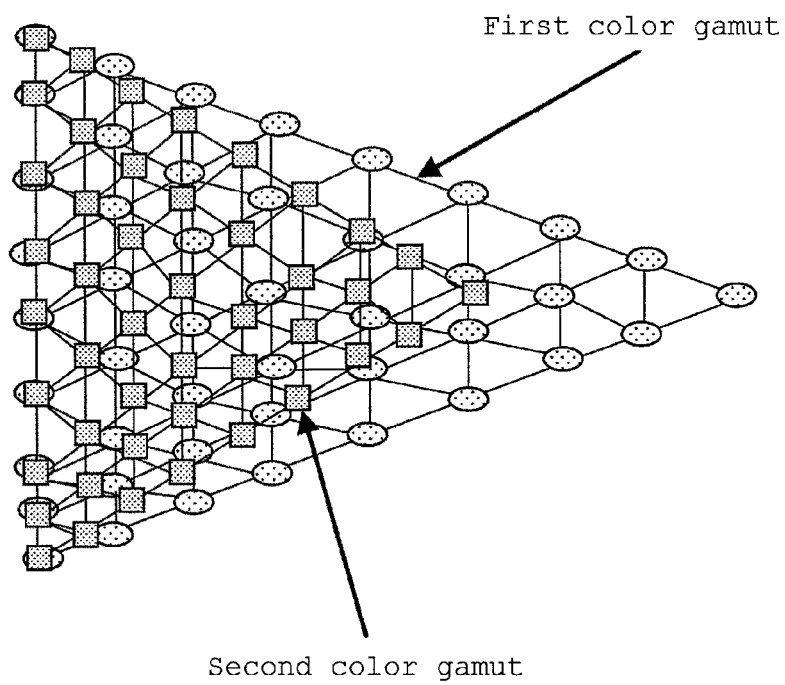
FIG. 17 is a view showing the first color gamut and the second color gamut after the brightness correction process according to still yet a further embodiment of the present invention.
Figure 18:
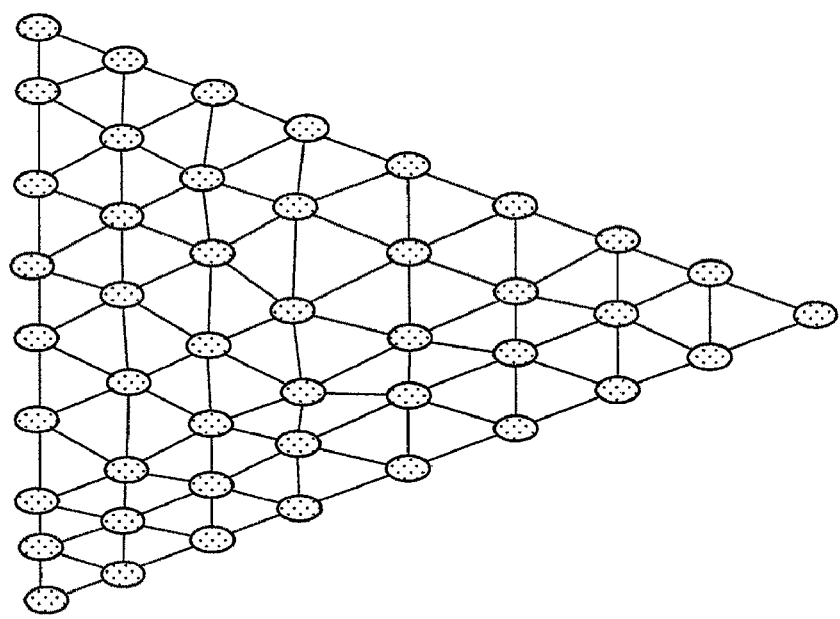
FIG. 18 is a view individually showing the first color gamut and the second color gamut from FIG. 17 according to still yet another embodiment of the present invention.
Figure 18:
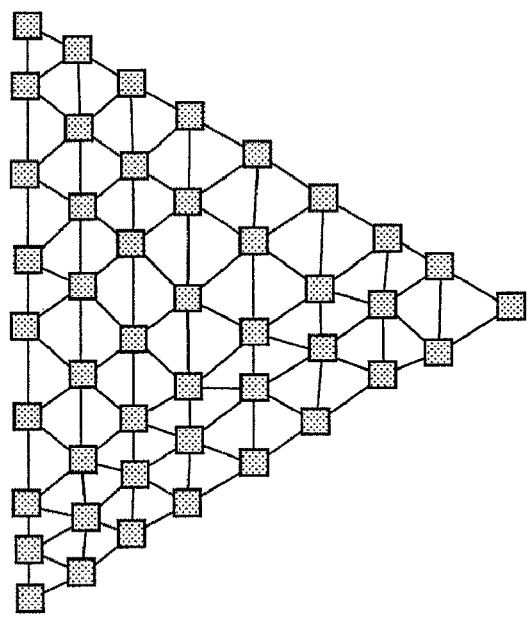

The first color gamut and the second color gamut after compression (after brightness correction process) are shown in FIG. 17. A view in which the first color gamut and the second color gamut, as shown in FIG. 17, are separated, is shown in FIG. 18.

LUT Generation Process

The compressed values are non-device dependent data such as CIE L*a*b*, and thus must be returned to color values of the color toners of Cyan, Magenta, Yellow, and Black, which are device dependent data.

The returning process includes tetrahedral interpolation, interpolation calculation in triangular surface, and the like. The returning process is disclosed in Japanese Laid-Open Patent Publication No. 7-95431 and described in Japanese Patent Publication No. 3,583,630.

The LUT generation unit 13 of the image forming device 10 executes the LUT generation process to generate the C-LUT based on the second color gamut generated in the color gamut generation process.

Color Data Conversion Program

The color data conversion program will now be described.

The color data conversion function, for executing the color data conversion method-of the computer (image forming device) according to one embodiment of the present invention is realized by a color data conversion program stored in the storage unit (e.g., a ROM and/or a hard disc).

The color data conversion program is read by the control unit 15 (CPU etc.) of the computer to send a command to each configuring unit of the computer. The command causes each configuring unit to perform a predetermined process such as color data generation process, color gamut compression process and LUT generation process.

Therefore, the color data conversion function is realized by cooperation of the color data conversion software program, and each configuring unit of the computer (image forming device), which is a source of hardware.

The color data conversion program for realizing the color data conversion function may be stored in a ROM, a hard disc, and the like of the computer, and furthermore, may be stored in a computer readable recording medium such as external storage device and other portable recording mediums.

The external storage device is a memory expansion device incorporating a recording medium such as CD-ROM and being externally connected to the image forming device. The portable recording medium is a recording medium, such as flexible disc, memory card, or magnetic optical disc can also be attached to the recording medium driving device (drive device) and is portable thus can be carried around.

The program recorded on the recording medium is loaded to the RAM and/or similar device of the computer and executed by the CPU (control unit). The function of the image forming device of the embodiment according to the present invention described above is realized by this execution method.

Furthermore, when loading the color data conversion program with the computer, the color data conversion program maybe held in another computer. In this case, the color data conversion program can be downloaded from another computer to its RAM or downloaded to an external storage device using a communication line. The downloaded color data conversion program is also executed by the CPU to realize the color data conversion function of the image forming device of the present embodiment.

According to the image forming device, the color data conversion method and the color data conversion program of an exemplary embodiment as described above is how the first color gamut is divided into a plurality of layers. Then compression of color data is performed for each layer, and thus the compression process of the color gamut can be performed without losing continuity of tones in the same hue.

The preferred embodiment of the image forming device, the color data conversion method, and the color data conversion program of the present invention has been described above, but it should be recognized that the image forming device, the color data conversion method, and the color data conversion program of the present invention are not limited only to the above described embodiments, as various modifications may be made within the scope of the present invention.

For instance, a color printer (copying machine) has been described in the embodiment as an example of the image forming device, but the image forming device is not limited to a color printer and may be a copying machine, a facsimile, a scanner, a digital multifunction peripheral, and/or the like.

If the image forming device is a printer, the printer includes but is not limited to various printer types such as an ink jet printer, a dye sublimation thermal transfer printer, a dot impact printer, an ink jet printer, a laser printer, and/or a melt type thermal transfer printer.

From the above description of the various embodiments in accordance with the present invention, the present invention can be summarized as follows.

One aspect of the present invention provides an image forming device for generating color data contained in a second color gamut of a second device based on color data contained in a first color gamut of a first device. The image forming device comprises a color data generation unit that divides the first color gamut into two or more layers based on grid point coordinates of a color conversion lookup table. Furthermore the invention includes but is not limited to a color gamut compression unit that generates a chroma value for each layer of the second color gamut based on a chroma value of each layer of the first color gamut. Additionally, an LUT generation unit generates the color conversion lookup table based on the generated second color gamut.

In the image forming device, the color data generation unit determines a maximum chroma value for each layer of the first color gamut, and obtains magnitude and/or direction of a vector. The vector is defined as starting at the maximum chroma value of one layer and ending at the maximum chroma value of the next layer. The color gamut compression unit compresses the maximum chroma value of an outermost layer of the first color gamut to a maximum chroma value of an outermost layer of the second color gamut. The compression unit in addition generates a maximum chroma value of each layer of the second color gamut based on the magnitude and/or the direction the vector. The vector has the maximum chroma value of the outermost layer of the second color gamut as a starting point. Then the compression unit determines a range of each layer of the second color gamut based on the maximum chroma value of each layer, and compresses a hue value of the first color gamut to the second color gamut based on the range of each layer. The LUT generation unit generates the color conversion lookup table based on the second color gamut generated through compression.

Additionally, the color gamut compression unit, before compressing the maximum chroma value of the outermost layer of the first color gamut to the maximum chroma value of the outermost layer of the second color gamut, moves a white point of the first color gamut so it is positioned on a CIE a*b* plane the same as a white point of the second color gamut when the first color gamut and the second color gamut are expressed in L*a*b* coordinates, and corrects each color data of the first color gamut according to the movement magnitude.

Further, the color gamut compression unit obtains an intersection of a L*axis and a perpendicular line through the maximum chroma value of a predetermined hue among any perpendicular lines with respect to the L*axis, divides a section between the white point of the second color gamut and the intersection based on the magnitude and/or the direction of the vector, each dividing point acting as one end point of each layer, divides a section between a black point of the second color gamut and the intersection based on the magnitude and/or the direction of the vector, each dividing point acting as the other end point of each layer. And the color gamut compression unit sets a range surrounded by the maximum chroma value, the one end point, and the other end point as a range of each layer for every layer.

Yet further, the color gamut compression unit creates a compressing direction line that connects each hue value of the first color gamut with the intersection. In addition, the gamut compression unit, after compression of the hue value, sets a point being within the range of the layer the hue value belongs to and being on the compression direction line.

Another aspect of the present invention provides a color data conversion method for generating color data contained in a second color gamut of a second device based on color data contained in a first color gamut of a first device. The method comprises color data generation step for dividing the first color gamut into two or more layers based on grid point coordinates of a color conversion lookup table, color gamut compression step for generating a chroma value of each layer of the second color gamut based on a chroma value of each layer of the first color gamut; and LUT generation step for generating the color conversion lookup table based on the generated second color gamut.

In the color data conversion method, the color data generation step includes the steps of determining a maximum chroma value of each layer of the first color gamut, and obtaining magnitude and/or direction of a vector, the vector defined as being from the maximum chroma value of one layer to the maximum chroma value of the next layer. The color gamut compression step includes the steps of compressing the maximum chroma value of an outermost layer of the first color gamut to a maximum chroma value of an outermost layer of the second color gamut, generating a maximum chroma value of each layer of the second color gamut based on the magnitude and/or the direction of the vector with the vector defined as having the maximum chroma value of the outermost layer of the second color gamut as a starting point, determining a range of each layer of the second color gamut based on the maximum chroma value of each layer, and compressing a hue value of the first color gamut to the second color gamut based on the range of each layer. The LUT generation step includes a step of generating the color conversion lookup table based on the second color gamut generated through compression.

Another further aspect of the present invention provides a recording medium for storing color data conversion programs for causing a computer of an image forming device to execute a process of generating color data contained in a second color gamut of a second device based on color data contained in a first color gamut of a first device. The recording medium is stored with programs for causing the computer of the image forming device to execute a color data generation step for dividing the first color gamut into two or more layers based on grid point coordinates of a color conversion lookup table, to execute a color gamut compression step for generating a chroma value of each layer of the second color gamut based on a chroma value of each layer of the first color gamut, and to execute a LUT generation step for generating the color conversion lookup table based on the generated second color gamut.

In the recording medium, the color data generation step includes the steps of determining a maximum chroma value of each layer of the first color gamut, and obtaining the magnitude and/or the vector of the vector direction of the maximum chroma value of one layer and the maximum chroma value of the next layer. The color gamut compression step includes the steps of compressing the maximum chroma value of an outermost layer of the first color gamut to a maximum chroma value of an outermost layer of the second color gamut, generating a maximum chroma value of each layer of the second color gamut based on the magnitude and/or the direction of the vector with the maximum chroma value of the outermost layer of the second color gamut as a starting point, determining a range of each layer of the second color gamut based on the maximum chroma value of each layer, and compressing a hue value of the first color gamut to the second color gamut based on the range of each layer. The LUT generation step includes a step of generating the color conversion lookup table based on the second color gamut generated through compression.

In addition, the device management program is provided in a computer readable recording medium including but not limited to a ROM (Read-Only Memory), a hard disk, a flexible disk, a memory card, or an optical disk.

Having thus described in detail preferred embodiments of the present invention, it is to be understood that the invention defined by the foregoing paragraphs is not to be limited to particular details and/or embodiments set forth in the above description, as many apparent variations thereof are possible without departing from the spirit or scope of the present invention.

What is claimed is:

1. An image forming device for generating color data contained in a second color gamut of a second device based on color data contained in a first color gamut of a first device; the image forming device comprising:
   a color data generation unit that is operable to divide the first color gamut into two or more layers based on grid point coordinates of a color conversion lookup table;
   a color gamut compression unit that is operable to generate a chroma value of each layer of the second color gamut based on a chroma value of each layer of the first color gamut; and
   an LUT generation unit that is operable to generate the color conversion lookup table based on the generated second color gamut wherein
   the color data generation unit is operable to,
     (i) determines a maximum chroma value for each layer of the first color gamut, and
     (ii) obtains magnitude and/or direction of a vector, the vector defined as starting from the maximum chroma value of one layer and ending at the maximum chroma value of the next layer;
   the color gamut compression unit is operable to,
     (i) compresses the maximum chroma value of an outermost layer of the first color gamut to a maximum chroma value of an outermost layer of the second color gamut,
     (ii) generates a maximum chroma value for each layer of the second color gamut based on the magnitude and/or the direction of the vector, with the vector defined as having the maximum chroma value of the outermost layer of the second color gamut as a starting point,
     (iii) determines a range of each layer of the second color gamut based on the maximum chroma value of each layer, and
     (iv) compresses a hue value of the first color gamut to the second color gamut based on the range of each layer; and
   the LUT generation unit is operable to generates the color conversion lookup table based on the second color gamut generated through compression.

2. The image forming device according to claim 1, wherein the color gamut compression unit is operable to, before compressing the maximum chroma value of the outermost layer of the first color gamut, moves a white point of the first color gamut so it is positioned on a CIE a*b* plane the same as a white point of the second color gamut, when the first color gamut and the second color gamut are expressed in L*a*b* coordinates, and
   corrects each color data of the first color gamut according to the movement magnitude.

3. The image forming device according to claim 2, wherein the color gamut compression unit is operable to,
   obtains the intersection of a L*axis and a perpendicular line through the maximum chroma value of a predetermined hue among any perpendicular lines with respect to the L*axis,
   divides a section between the white point of the second color gamut and the intersection based on the magnitude and/or the direction of the vector, each dividing point acting as one end point of each layer,
   divides a section between a black point of the second color gamut and the intersection based on the magnitude and/or the direction of the vector, each dividing point acting as the other end point of each layer, and
   sets a range surrounded by the maximum chroma value, the one end point, and the other end point as a range of each layer for every layer.

4. The image forming device according to claim 3, wherein the color gamut compression unit is operable to creates a compressing direction line that connects each hue value of the first color gamut with the intersection.

5. The image forming device according to claim 4, wherein the color gamut compression unit is operable to, after compression of the hue value, sets a point being within the range of the layer the value belongs to and being on the compression direction line.

6. A color data conversion method for generating color data contained in a second color gamut of a second device based on color data contained in a first color gamut of a first device; the method comprising:
   dividing the first color gamut into two or more layers based on grid point coordinates of a color conversion lookup table;
   generating a chroma value for each layer of the second color gamut based on a chroma value of each layer of the first color gamut; and
   generating the color conversion lookup table based on the generated second color gamut wherein
   said dividing the first color gamut into two or more layers includes determining a maximum chroma value of each layer of the first color gamut, and obtaining magnitude and/or direction of a vector, the vector defined as being from the maximum chroma value of one layer to the maximum chroma value of the next layer;
   said generating a chroma value for each layer of the second color gamut includes,
     compressing the maximum chroma value of an outermost layer of the first color gamut to a maximum chroma value of an outermost layer of the second color gamut,
     generating a maximum chroma value of each layer of the second color gamut based on the magnitude and/or the direction of the vector, with the vector defined as having the maximum chroma value of the outermost layer of the second color gamut as a starting point,
     determining a range of each layer of the second color gamut based on the maximum chroma value of each layer, and
     compressing a hue value of the first color gamut to the second color gamut based on the range of each layer; and
   said generating the color conversion lookup table includes generating the color conversion lookup table based on the second color gamut generated through compression.

7. A non-transitory recording medium for storing color data conversion programs for causing a computer of an image forming device to execute a process of generating color data contained in a second color gamut of a second device based on color data contained in a first color gamut of a first device; the recording medium stored with programs for causing the computer of the image forming device to execute the process comprising:

dividing the first color gamut into two or more layers based on grid point coordinates of a color conversion lookup table;

generating a chroma value of each layer of the second color gamut based on a chroma value of each layer of the first color gamut; and generating the color conversion lookup table based on the generated second color gamut wherein said dividing the first color gamut into two or more layers includes, determining a maximum chroma value of each layer of the first color gamut, and obtaining the magnitude and/or the direction of the vector of the maximum chroma value of one layer and the maximum chroma value of the next layer;

said generating a chroma value for each layer of the second color gamut includes, compressing the maximum chroma value of an outermost layer of the first color gamut to a maximum chroma value of an outermost layer of the second color gamut, generating a maximum chroma value of each layer of the second color gamut based on the magnitude and/or the direction of the vector with the maximum chroma value of the outermost layer of the second color gamut as a starting point, determining a range of each layer of the second color gamut based on the maximum chroma value of each layer, and compressing a hue value of the first color gamut to the second color gamut based on the range of each layer; and said generating the color conversion lookup table includes generating the color conversion lookup table based on the second color gamut generated through compression.

8. The color data conversion method according to claim 6, wherein said generating a chroma value for each layer of the second color gamut, before compressing the maximum chroma value of the outermost layer of the first color gamut, includes, moving a white point of the first color gamut so it is positioned on a CIE a*b* plane the same as a white point of the second color gamut, when the first color gamut and the second color gamut are expressed in L*a*b* coordinates, and correcting each color data of the first color gamut according to the movement magnitude.

9. The color data conversion method according to claim 8, wherein said generating a chroma value for each layer of the second color gamut includes, obtaining an intersection of a L*axis and a perpendicular line through the maximum chroma value of a predetermined hue among any perpendicular lines with respect to the L*axis, dividing a section between the white point of the second color gamut and the intersection based on the magnitude and/or the direction of the vector, each dividing point acting as one end point of each layer, dividing a section between a black point of the second color gamut and the intersection based on the magnitude and/or the direction of the vector, each dividing point acting as the other end point of each layer, and setting a range surrounded by the maximum chroma value, the one end point, and the other end point as a range of each layer for every layer.

10. The color data conversion method according to claim 9, wherein said generating a chroma value for each layer of the second color gamut includes creating a compressing direction line that connects each hue value of the first color gamut with the intersection.

11. The color data conversion method according to claim 10 wherein said generating a chroma value for each layer of the second color gamut, after compression of the hue value, includes setting a point being within the range of the layer the value belongs to and being on the compression direction line.

12. The non-transitory recording medium according to claim 7, wherein said generating a chroma value for each layer of the second color gamut, before compressing the maximum chroma value of the outermost layer of the first color gamut, includes, moving a white point of the first color gamut so it is positioned on a CIE a*b* plane the same as a white point of the second color gamut, when the first color gamut and the second color gamut are expressed in L*a*b* coordinates, and correcting each color data of the first color gamut according to the movement magnitude.

13. The non-transitory recording medium according to claim 12, wherein said generating a chroma value for each layer of the second color gamut includes, obtaining an intersection of a L*axis and a perpendicular line through the maximum chroma value of a predetermined hue among any perpendicular lines with respect to the L*axis, dividing a section between the white point of the second color gamut and the intersection based on the magnitude and/or the direction of the vector, each dividing point acting as one end point of each layer, dividing a section between a black point of the second color gamut and the intersection based on the magnitude and/or the direction of the vector, each dividing point acting as the other end point of each layer, and setting a range surrounded by the maximum chroma value, the one end point, and the other end point as a range of each layer for every layer.

14. The non-transitory recording medium according to claim 13, wherein said generating a chroma value for each layer of the second color gamut includes creating a compressing direction line that connects each hue value of the first color gamut with the intersection.

15. The non-transitory recording medium according to claim 14 wherein said generating a chroma value for each layer of the second color gamut, after compression of the hue value, includes setting a point being within the range of the layer the value belongs to and being on the compression direction line.

* * * * *